US010196000B2

(12) United States Patent
Loew et al.

(10) Patent No.: US 10,196,000 B2
(45) Date of Patent: Feb. 5, 2019

(54) VEHICLE TRUNK

(71) Applicant: FORD GLOBAL TECHNOLOGIES, LLC, Dearborn, MI (US)

(72) Inventors: Pattrick Loew, Dearborn, MI (US); Kendra White, Redford, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 22 days.

(21) Appl. No.: 15/595,184

(22) Filed: May 15, 2017

(65) Prior Publication Data
US 2018/0326912 A1  Nov. 15, 2018

(51) Int. Cl.
B60R 11/06 (2006.01)
B60R 5/04 (2006.01)
B60R 7/02 (2006.01)
B60R 13/01 (2006.01)

(52) U.S. Cl.
CPC .............. B60R 5/042 (2013.01); B60R 7/02 (2013.01); B60R 13/013 (2013.01); B60R 5/04 (2013.01); B60R 5/047 (2013.01); B60R 13/01 (2013.01)

(58) Field of Classification Search
CPC ......... B60R 5/042; B60R 7/02; B60R 13/013; B60R 5/04; B60R 5/047; B60R 13/01
See application file for complete search history.

(56) References Cited

U.S. PATENT DOCUMENTS

| 4,718,584 | A | 1/1988 | Schoeny |
| 4,964,528 | A | 10/1990 | Wagoner |
| 5,626,380 | A * | 5/1997 | Elson ........................ B60R 7/02 296/37.1 |
| 9,381,865 | B2 | 7/2016 | Kmita et al. |
| 2002/0179663 | A1 * | 12/2002 | Moore ...................... B60R 7/02 224/539 |
| 2006/0170236 | A1 * | 8/2006 | Porter, II .................. B60R 5/04 296/37.16 |
| 2008/0145172 | A1 * | 6/2008 | Sturt ..................... B60P 7/0876 410/118 |
| 2008/0190278 | A1 * | 8/2008 | Martin .................. F41H 5/0407 89/36.07 |
| 2015/0251712 | A1 * | 9/2015 | Craven ................. B62D 43/06 296/37.2 |
| 2015/0360621 | A1 | 12/2015 | Atherton et al. |
| 2018/0016817 | A1 * | 1/2018 | Ayala Diaz ............. E05B 85/10 |

FOREIGN PATENT DOCUMENTS

DE    10354882 A1    6/2005

* cited by examiner

Primary Examiner — Lori L Lyjak
(74) Attorney, Agent, or Firm — Vichit Chea; Brooks Kushman P.C.

(57) ABSTRACT

A vehicle trunk includes a panel having a leg protruding past a perimeter thereof and a trunk floor defining a recess and cavity. The leg occupies a first portion of the cavity to secure the panel perpendicular to the floor, and a second portion of the cavity different from the first to secure the panel flush within the recess such that the panel is disposed over unoccupied portions of the cavity.

20 Claims, 4 Drawing Sheets

VEHICLE TRUNK

TECHNICAL FIELD

The present disclosure relates to trunks of motor vehicles. In particular, the present disclosure relates to trunk floors of motor vehicles.

BACKGROUND

Motor vehicles may include a trunk with a trunk floor defining a space of the trunk for storing items. In some vehicles, the space may be sized such that items stored at an end of the trunk opposite an opening of the trunk may be difficult to access.

SUMMARY

According to an embodiment, a vehicle trunk includes a panel having a leg protruding past a perimeter thereof and a trunk floor defining a recess and cavity. The leg occupies a first portion of the cavity to secure the panel perpendicular to the floor, and a second portion of the cavity different from the first to secure the panel flush within the recess such that the panel is disposed over unoccupied portions of the cavity.

According to another embodiment, a vehicle trunk includes a panel having a leg protruding from a major side thereof past a perimeter of the panel and a trunk floor defining a recess and cavity adjacent an edge of the recess, such that the leg is engageable with the cavity in a first position to secure the panel perpendicular to the floor, and in a second position to secure the panel flush within the recess.

According to another embodiment, a vehicle trunk includes a moveable panel having a first leg protruding therefrom and a trunk floor defining a recessed surface area and a first cavity adjacent thereto for engaging with the first leg, such that a minor side of the panel contacts and is supported by the recessed surface area in a first position, and a major side of the panel contacts and is supported by the recessed surface area in a second position.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
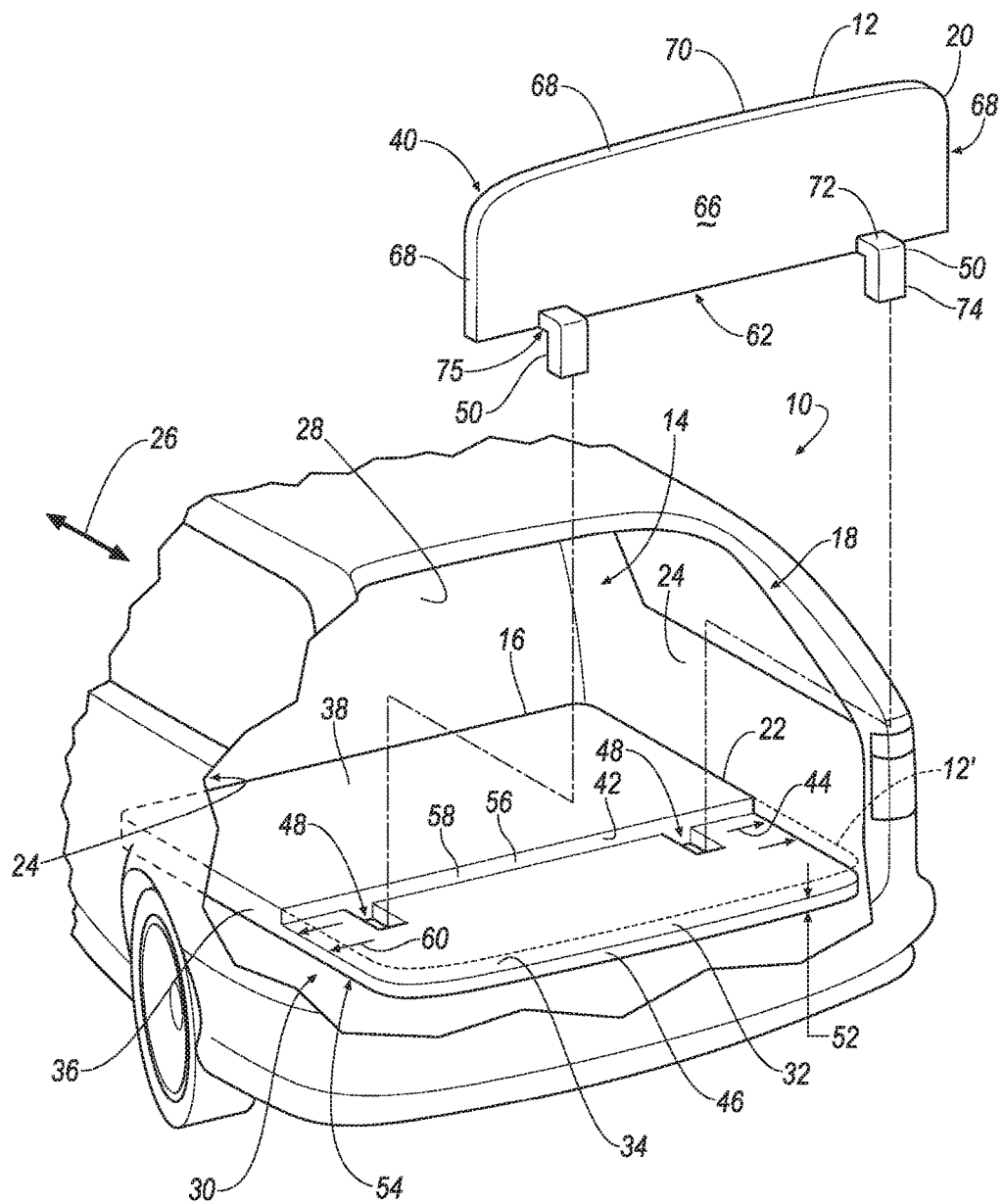
FIG. 1 is a fragmentary exploded view of a vehicle trunk with a panel in a raised position in accordance with an embodiment of the instant disclosure.

FIG. 1 is a fragmentary exploded view of a vehicle trunk 10 with a moveable panel 12 in a raised position in accordance with an embodiment of the instant disclosure. The trunk 10 may include a space 14 for storing items. In some vehicles, the space 14 may be sized such that items stored at an end 16 of the trunk 10 opposite an opening 18 thereof may be difficult to access. It may be desirable to have a space 14 with variable size depending on what is desired. In the illustrated embodiment, the panel 12 may be configured to move to the raised position in which a main portion 20 of the panel 12 is perpendicular to a trunk floor 22 of the trunk 10, and to a lowered position (depicted as reference numeral 12' in FIG. 1) in which the main portion 20 of the panel 12' is flush with the floor 22. Although the raised position in the disclosure is illustrated as the panel 12 being disposed perpendicularly to the floor 22, the raised position may be a position in which the panel 12 is at a different angle(s) relative to the floor 22.

With continued reference to FIG. 1, the trunk 10 may include the trunk floor 22. The trunk floor 22 may serve as the base of the trunk 10 which is configured to support items stored in the space 14. In one embodiment, the trunk floor 22 may span laterally between sidewalls 24 of the vehicle and in a fore-aft direction 26 between rear seats 28 and the opening 18. Beneath the trunk floor 22 may be a cavity(ies) 30 for storing the spare wheel and other related or unrelated items. The trunk floor 22 or a portion thereof may move in some manner to access the cavity(ies) 30 below.

The panel 12 in the lowered position is depicted as broken lines with the reference numeral of 12' in FIG. 1. The trunk floor 22 may define a recess 32 for receiving the main portion 20 of the panel 12' in the lowered position. The floor 22 may also define a recessed surface area 34 that supports the panel 12' in the lowered position. Adjacent the recess 32 and proximate the rear seats 28, the trunk floor 22 may include an elevated portion 36 with an elevated topside 38. In one embodiment, the elevated topside 38 of the floor 22 that is disposed adjacent the recess 32 may be flush with a topside 40 of the panel 12' in the lowered position (when the panel 12' is within the recess 32). The floor 22 may also include an edge surface 42 extending between the elevated topside 38 and recessed surface area 34. In the illustrated embodiment, the elevated topside 38 and recessed surface area 34 are parallel to and offset from one another, and the edge surface 42 extends perpendicularly relative to the topside 38 and recessed surface area 34. The recess 32 and recessed surface area 34 may extend a width 44 of the floor 22 and span laterally between the sidewalls 24 of the vehicle. In other embodiments, the recess 32 and recessed surface area 34 may have a width greater than or less than the width 44 of the floor 22. Furthermore, the recess and recessed surface may extend from the edge surface to the opening. In other embodiments, the recess 32 and recessed surface area 34 may extend from the edge surface 42 of the floor 22 to a distance between the edge surface 42 and an end 46 of the trunk floor 22. The edge surface 42 may act as a dividing line at which the space 14 may be divided by moving the panel 12 to the raised position. In some embodiments, the edge surface 42 of the floor 22 is disposed at a distance of two to three feet from the opening 18.

Still referring to FIG. 1, the floor 22 may define cavities 48 for receiving and engaging with legs 50, respectively, of the panel 12 in the lowered and raised positions. The cavities 48 may be spaced apart from one another in accordance with the spacing of the legs 50 of the panel 12 such that the outer edges of the panel 12 are flush with the corresponding outer edges of the floor 22 in the lowered position. Each of the cavities 48 may extend through a thickness 52 of the floor 22 underneath the recess 32. Each of the cavities 48 may extend between the recessed surface area 34 and an underside 54 of the floor 22. Each of the cavities 48 may be disposed adjacent a perimeter 56 and/or edge 58 of the recess 32. Each of the cavities 48 may be disposed adjacent the edge surface 42 of the floor 22. In one embodiment, the edge surface may define the cavities 48 such that a portion of the edge surface 42 is a face of the cavity 48 that bounds the cavity 48. Although in the illustrated embodiment, the cavities 48 are formed below the recessed surface area 34, in other embodiments, the cavities 48 may extend past the edge surface 42 and below the elevated topside 38 of the floor 22. The cavities 48 may be generally rectangular in shape to accommodate the shape of the respective legs 50. The cavities 48 and/or legs 50 may take on other shapes and sizes within the spirit and scope of the disclosure. Furthermore, although the illustrated embodiment includes two cavities 48 for two legs 50 of the panel 12, one of ordinary skill in the art will understand that there may be more or less than two cavities 48 and/or legs 50. For example and without limitation, there may be one cavity 48 than spans a majority of a width 60 of the recessed surface area 34 to accommodate a similarly shaped and sized leg 50 of the panel 12.

The trunk 10 may include the panel 12 that may be movable by the user between the lowered and raised positions. The panel 12 may be sized and shaped to fit within the recess 32 of the floor 22 in the lowered position, such that the outer edge surfaces of the panel 12 are flush with the corresponding edge surfaces of the floor 22 in the lowered position. In addition, the floor 22 and panel 12 may be configured such that a minor side 62 of the panel 12 abuts the edge surface 42 of the floor 22 in the lowered position. The panel 12 may include major sides 40, 66, major side 40 being the topside of the panel 12. The major side 66 of the panel 12 may be an underside of the panel 12 and be visible when the panel 12 is in the raised position. The major sides 40, 66 may be the sides or surfaces of the panel 12 that have a larger surface area (and are generally parallel to one another in the illustrated embodiment), and the minor sides 62, 68 are the sides or surfaces of the panel 12 that have a smaller surface area. In the illustrated embodiment, the panel 12 has two major sides 40, 66 and four minor sides 62, 68 extending between the major sides 40. There may be other configurations, however. As shown in FIG. 1, the minor side 62 of the panel 12 may contact and be supported by the recessed surface area 34 of the floor 22 in the raised position, and the major side 66 of the panel 12 may contact and be supported by the recessed surface area 34 in the lowered position.

Still referring to FIG. 1, the legs 50 of the panel 12 may protrude from the major side 66 past the perimeter 56 of the panel 12 and past the minor side 62, and the legs 50 may be engageable with the cavities 48, respectively, in the raised position to orient and secure the panel 12 perpendicular to the floor 22 and in the lowered position to orient and secure the panel 12 flush within the recess 32. The legs 50 may be spaced apart from one another. Each of the legs 50 may be disposed adjacent the perimeter 56 of the panel 12 opposite an end 70 of the panel 12 that is adjacent the opening 18 in the lowered position. The legs 50 may be used to secure the panel 12 in the raised and lowered positions. In the illustrated embodiment, each of the legs 50 is generally L-shaped with a base 72 of the leg 50 projecting perpendicularly from the major side 66 of the panel 12 (the underside), and a longitudinal portion 74 of the leg 50 extending perpendicularly from the base 72 in a direction parallel to the major side 66. An edge surface 75 of the base 72 may be flush with the minor side 62 of the panel 12 such that the minor side 62 defines the base 72. The base 72 of the leg 50 may be generally rectangular in shape. The longitudinal portion 74 of the leg 50 may extend past the perimeter 56 and minor side 62 of the panel 12. Although the leg 50 is illustrated as being generally L-shaped and protruding from the major side 66 of the panel 12, one or ordinary skill in the art will understand other configurations within the spirit and scope of the disclosure. For example and without limitation, the leg 50 may instead protrude from the minor side 62, and, in the lowered position, protrude into a cavity that extends past the edge surface 42 of the floor 22 underneath the elevated topside 38). In the illustrated embodiment, the leg 50 is fixed relative to the main portion 20 of the panel 12. The panel 12 and legs 50 may comprise the same or different material(s). For example and without limitation, the panel 12 and floor 22 may comprise compressed fibrous material wrapped with carpet fabric-like material, and the legs 50 may comprise plastic, metal, or compressed fibrous material.

Figure 2:
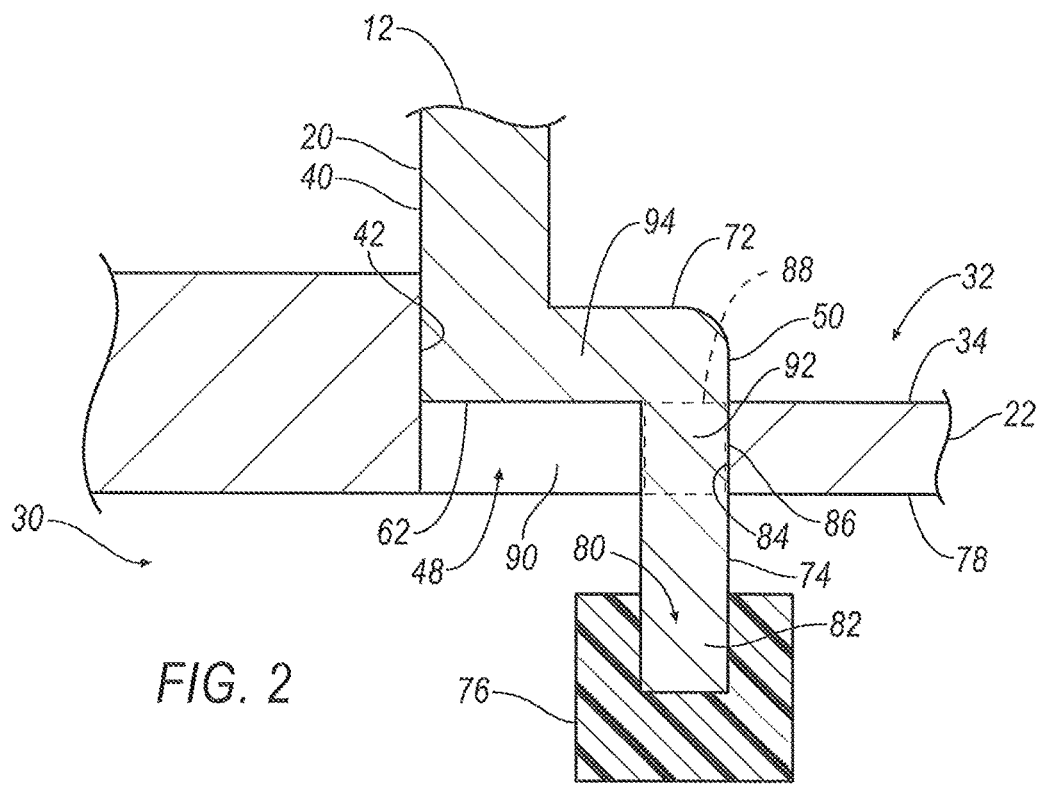
FIGS. 2-3 are fragmentary cross-sectional views illustrating a leg of the panel engaging a cavity of a floor of the trunk of FIG. 1 in the raised and lowered positions, respectively.
Figure 3:
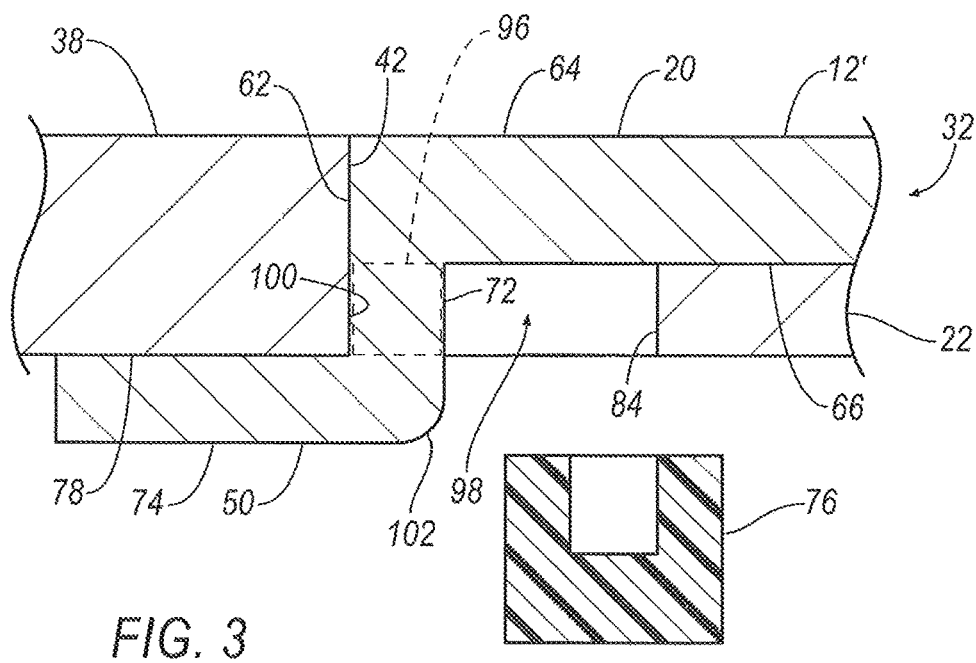

FIGS. 2-3 are fragmentary cross-sectional views illustrating the leg 50 of the panel 12 engaging the cavity 48 of the floor 22 of the trunk 10 of FIG. 1 in the raised and lowered positions, respectively. Because both legs 50 and cavities 48 are uniform in size and shape in the illustrated embodiment, FIGS. 2-3 illustrates both legs 50 and cavities 48 of the illustrated embodiment. The vehicle trunk 10 may include a stabilizing member 76 for stabilizing the panel 12 in at least one of the raised and lowered positions. In the illustrated embodiment, the stabilizing member 76 stabilizes the panel 12 in the raised position. The stabilizing member 76 may be disposed underneath the floor 22 opposite the recess 32 and recessed surface area 34. In one embodiment, the stabilizing member 76 may be disposed in the cavity 30 below the floor 22 (explained hereinabove in connection with FIG. 1). In another embodiment, the stabilizing member 76 is mounted to an underside 78 of the floor 22. The stabilizing member 76 may remain generally fixed. The stabilizing member 76 may define a stabilizing cavity 80 for receiving a segment 82 of the longitudinal portion 74 of the leg 50 opposite the base 72 of the leg 50 in the raised position. The stabilizing member 76 may be generally rectangular in shape, and the stabilizing cavity 80 may be generally rectangular in shape to accommodate the shape of the leg 50 that is received within the cavity 80.

Upon positioning the panel 12 in the raised position, the user may orient the main portion 20 of the panel 12 perpendicular to the floor 22 and lower the panel 12 in a downward direction toward the floor 22, such that the longitudinal portion 74 of the leg 50 slides past a face 84 of the cavity 48 and into the stabilizing cavity 80 such that an edge surface 86 of the longitudinal portion 74 of the leg 50 abuts the face 84 of the cavity 48 in the raised position. Similarly, the major side 40 of the panel 12 may slide along the edge surface 42 of the floor 22 until portions of the minor side 62 of the panel 12 contact the recessed surface area 34 of the floor 22 and/or the leg 50 is received within the stabilizing cavity 80 such that the major side 40 of the panel 12 abuts the edge surface 42 of the floor 22 in the raised position. As such, portions of the minor side 62 of the panel 12 may contact and be supported by the recessed surface area 34 of the floor 22 in the raised position, and the major side 40 of the panel 12 may contact and be supported by the recessed surface area 34 in the lowered position. Portions of the minor side 62 aligned with the cavities 48 do not contact the recessed surface area 34 in the raised position and, instead, are disposed over the respective cavity 48. Although the stabilizing member 76 is illustrated as being spaced from the underside 78 of the floor 22, the stabilizing member 76 may contact the floor 22 such that the stabilizing cavity 80 is adjacent the cavity 48. In one embodiment, the stabilizing member 76 may be integral with the floor 22 such that the stabilizing cavity 80 is formed adjacent the cavity 48. The stabilizing member 76 may comprise a structural or semi-rigid foam in some embodiments.

With reference to FIG. 2, the leg 50 of the panel 12 may occupy a portion 88 of the cavity 48 to orient and secure the main portion 20 of the panel 12 perpendicular to the floor 22 in the raised position such that the panel 12 is disposed over an unoccupied portion 90 of the cavity 48 in the raised position. In the illustrated embodiment, a segment 92 of the longitudinal portion 74 of the leg 50 adjacent the base 72 occupies the portion 88 of the cavity 48 in the raised position, and the main portion 20 of the panel 12 and a portion 94 of the base 72 of the leg 50 adjacent the main portion 20 of the panel 12 are disposed over the unoccupied portion 90 of the cavity 48, such that the minor side 62 of the panel 12 is adjacent the unoccupied portion 90. In the raised position, the underside, major side 66, of the panel 12 is visible. Faces of the cavities 48 (bounding and defining the respective cavity 48) and the edge surface 42 of the floor 22 may aid in securing the panel 12 in the raised position.

With reference to FIG. 3, the leg 50 of the panel 12' may occupy a portion 96 of the cavity 48 (different from and adjacent to the portion 88 (FIG. 2) of the cavity 48 occupied by the leg 50 in the raised position) to orient and secure the main portion 20 of the panel 12' flush within the recess 32 of the floor 22 in the lowered position such that the panel 12' is disposed over an unoccupied portion 98 of the cavity 48 in the lowered position. In the illustrated embodiment, the base 72 of the leg 50 occupies the portion 96 of the cavity 48 in the lowered position, and the main portion 20 of the panel 12' adjacent the leg 50 is disposed over the unoccupied portion 98 of the cavity 48, such that the underside 66 of the panel 12' is adjacent and disposed over the unoccupied portion 98. In the lowered position, the major side (topside) 64 of the panel 12' may be visible, and the minor side 62 of the panel 12' and base 72 of the leg 50 may abut and contact the edge surface 42 of the floor 22 and a face 100 of the cavity 48 opposite the face 84. The face 100 of the cavity 48 and the edge surface 42 of the floor 22 may aid in securing the panel 12' in the lowered position. The leg 50 may protrude past the edge surface 42 of the floor 22 and below the elevated topside 38 in the lowered position. The underside 78 of the floor 22 opposite the elevated topside 38 may contact the longitudinal portion 74 of the leg 50 and also aid in securing the panel 12' in the lowered position. Upon moving the panel 12' from the lowered position to the raised position, the user may move the panel 12' in a direction toward the opening 18 (FIG. 1) of the trunk 10 and in an upward direction. A corner 102 of the base 72 of the leg 50 may be rounded to facilitate clearance of the leg 50 past the face 84 of the cavity 48 upon moving the leg 50 out of the cavity 48. Other corners of the panel 12, leg 50, and floor 22 may be rounded to facilitate movement of the panel 12' as well.

With reference to FIGS. 2-3, the occupied portion 88 of the cavity 48 in the raised position may be, in whole or in part, the unoccupied portion 98 of the cavity 48 in the lowered position, and the occupied portion 96 of the cavity 48 in the lowered position may be, in whole or in part, the unoccupied portion 90 of the cavity 48 in the raised position. In addition, in the raised position, the base 72 of the leg 50 may be disposed within the recess 32 of the floor 22 with the longitudinal portion 74 of the leg 50 extending downward through the cavity 48 and into the stabilizing cavity 80 of the stabilizing member 76.

Figure 4:
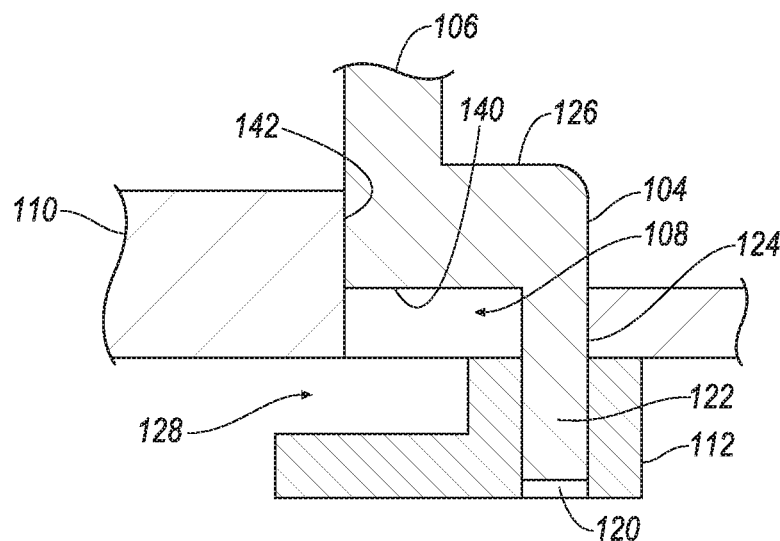
FIGS. 4-5 are fragmentary cross-sectional views illustrating a leg of a panel engaging a cavity of a trunk floor of the vehicle trunk of FIG. 1 in raised and lowered positions, respectively, in accordance with another embodiment of the instant disclosure.
Figure 5:
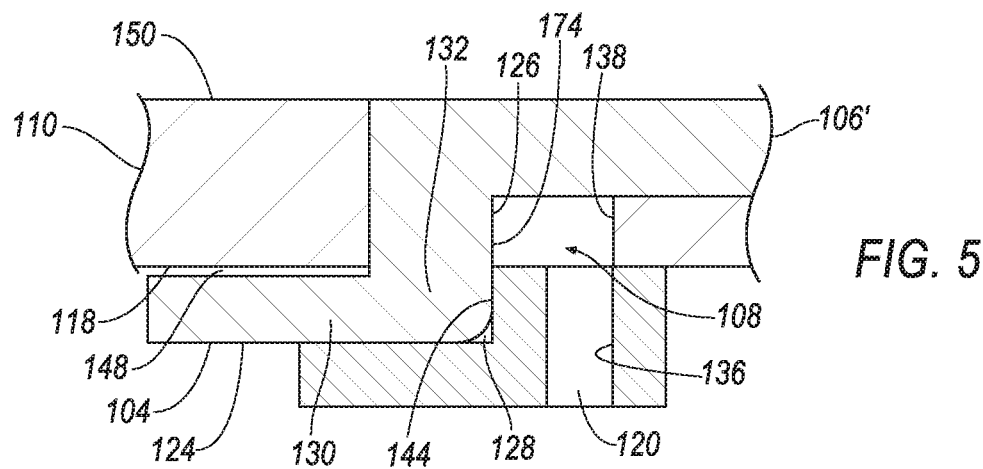
Figure 6:
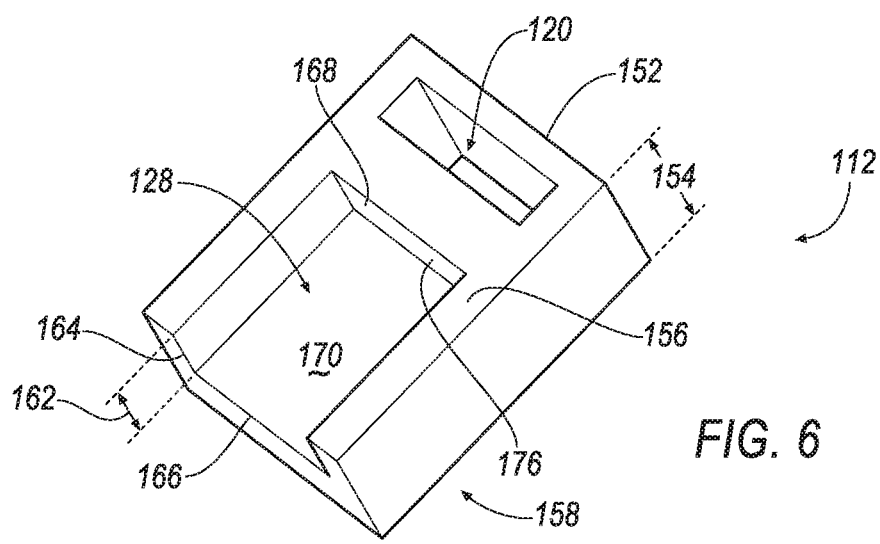
FIG. 6 is a perspective view of a stabilizing member illustrated in FIGS. 4-5.

FIGS. 4-5 are fragmentary cross-sectional views illustrating a leg 104 of a panel 106 engaging a cavity 108 of a trunk floor 110 of the vehicle trunk 10 of FIG. 1 in raised and lowered positions, respectively, in accordance with another embodiment of the instant disclosure. FIG. 6 is a perspective view of a stabilizing member 112 illustrated in FIGS. 4-5. The panel 106, trunk floor 110, and stabilizing member 112 illustrated in FIGS. 4-6 may be used in the trunk 10 of FIG. 1 in another embodiment. The panel 106 and floor 110 illustrated in FIGS. 4-5 are similar to the panel 12 and floor 22 illustrated in FIGS. 1-3, except the illustrated embodiment of FIGS. 4-6 includes a different stabilizing member 112. Similar to the panel 12 of the illustrated embodiment of FIGS. 1-3, the panel 106 illustrated in FIGS. 4-5 may include two legs 104 spaced apart from one another. Some of the differences between the two illustrated embodiments will now be discussed.

Referring to FIG. 6, the stabilizing member 112 may stabilize the panel 106 in at least one of the raised and lowered positions. In the illustrated embodiment, the stabilizing member 112 stabilizes the panel 106 in the raised position and in the lowered position. The stabilizing member 112 may be disposed underneath the floor 110 opposite a recess 114 and recessed surface area 116. In one embodiment, the stabilizing member 112 may be disposed in a cavity 30 below the floor 110 (such a cavity(ies) explained hereinabove in connection with FIG. 1). In the illustrated embodiment, the stabilizing member 112 is mounted to an underside 118 of the floor 110. The stabilizing member 112 may remain generally fixed.

With reference to FIG. 4, the stabilizing member 112 may define a stabilizing cavity 120 for receiving a segment 122 of a longitudinal portion 124 of the leg 104, the segment 122 being disposed opposite a base 126 of the leg 104 in the raised position. With reference to FIG. 5, the stabilizing member 112 may define a stabilizing cavity 128 for receiving a segment 130 of the longitudinal portion 124 of the leg 104 and a segment 132 of the base 126 of the leg 104 in the lowered position. The stabilizing member 112 may be positioned adjacent the cavity 108 of the floor 110 such that a face 136 of the stabilizing cavity 120 is aligned with a face 138 of the cavity 108 of the floor 110 in the raised position to allow the longitudinal portion 124 of the leg 104 to be oriented perpendicularly to the floor 110. In addition, the stabilizing member 112 may be configured and/or positioned adjacent the cavity 108 of the floor 110 such that a minor side 140 of the panel 106' and the base 126 of the leg 104 abut or contact an edge surface 142 of the floor 110 and/or the base 126 of the leg 104 abuts or contacts a face 144 of a stabilizing cavity 128 of the stabilizing member 112 in the lowered position. Furthermore, the stabilizing member 112 may be configured and/or positioned adjacent the cavity 108 of the floor 110 such that there is a gap 148 between the longitudinal portion 124 of the leg 104 and underside 118 of the floor 110 opposite an elevated topside 150 of the floor 110 in the lowered position. The gap 148 may allow the panel 106' to be moved in an upwards direction upon moving the panel 106' from the lowered position to the raised position.

Referring to FIG. 6, the stabilizing member 112 may have an overall rectangular shape with the stabilizing cavities 120, 128 formed therein. The stabilizing cavity 120 may be generally rectangular in shape to accommodate the shape of the leg 104 that is received within the cavity 120. In the illustrated embodiment, the stabilizing cavity 120 is disposed adjacent an end 152 of the member 112 and extends through a thickness 154 of the member 112 (between upper and lower surfaces 156, 158 thereof). The stabilizing cavity 120 may be sized to receive a segment 160 of the longitudinal portion 124 of the leg 104 to secure the leg 104 in the raised position. Although the illustrated embodiment includes one stabilizing cavity 120 for receiving the leg 104 in the raised position, there may be more than one stabilizing cavity 120 in the stabilizing member 112 for receiving the leg 104 such that the user can choose among multiple raised positions, each position resulting in a differently sized space 14 (FIG. 1) in the trunk 10. Furthermore, although the stabilizing cavity 120 is illustrated as extending through the thickness 154 of the member 112, the stabilizing cavity 120 may extend partially through the member 112 to a distance between the upper and lower surfaces 156, 158.

Still referring to FIG. 6, the stabilizing cavity 128 may be disposed adjacent to stabilizing cavity 120 and extend from the upper surface 156 of the member 112 to a distance 162 between the upper and lower surfaces 156, 158. The stabilizing member 112 may have an open end 164 to allow the leg 104 (FIG. 5) to protrude past an edge 166 of the member 112 opposite the stabilizing cavity 120. A closed end 168 of the stabilizing cavity 128 may be disposed adjacent the stabilizing cavity 120. The stabilizing cavity 128 may be generally rectangular in shape to accommodate the shape and/or size of the leg 104. In the lowered position, the longitudinal portion 124 of the leg 104 (FIG. 5) may contact and be supported by a floor 170 of the member 112 defining the cavity 128 and that is spaced from the lower surface 158 of the member 112. Also, in the lowered position, a surface 174 of the base 126 of the leg 104 (FIG. 5) may contact or abut a face 176 of the stabilizing cavity 128 to further secure the leg 104 and panel 106' in the lowered position. Referring to FIGS. 4-5, in the raised position, the stabilizing cavity 128 may be unoccupied by the leg 104, and in the lowered position, the stabilizing cavity 120 may be unoccupied by the leg 104.

Figure 7:
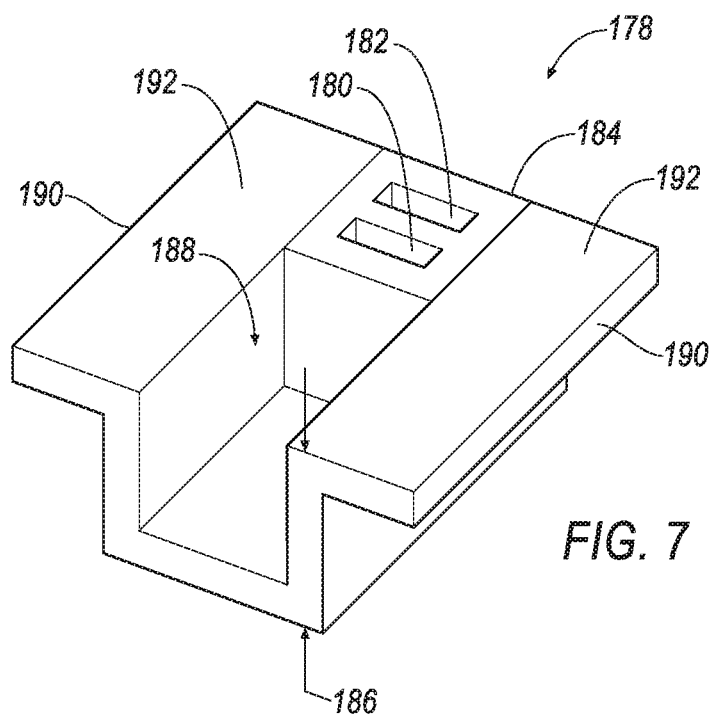
FIG. 7 is a perspective view of a stabilizing member that may be used with the panel and trunk floor illustrated in FIGS. 4-5 in accordance with another embodiment of the instant disclosure.

FIG. 7 is a perspective view of a stabilizing member 178 that may be used with the panel 106 and trunk floor 170 illustrated in FIGS. 4-5 in accordance with another embodiment of the instant disclosure. The stabilizing member 178 may be similar to the stabilizing member 112 of FIG. 6. Some of the differences between the two illustrated embodiments will now be discussed.

The stabilizing member 178 may define stabilizing cavities 180, 182 for receiving the segment 122 of the longitudinal portion 124 of the leg 104 (FIG. 4) in two raised positions. The user may choose which stabilizing cavity 180, 182 to insert the leg through upon moving the panel 106 from the lowered position to one of the raised positions. The stabilizing cavities 180, 182 may be generally rectangular in shape to accommodate the shape of the leg 104. In the illustrated embodiment, the stabilizing cavity 182 is disposed adjacent an end 184 of the member 178 and extends through a thickness 186 of the member 178. The stabilizing cavity 180 may be disposed between the stabilizing cavity 182 and a stabilizing cavity 188 for receiving the leg 104 in the lowered position. The stabilizing cavities 180, 182 may be sized to receive a segment 160 of the longitudinal portion 124 of the leg 104 to secure the leg 104 in the raised positions (leg 104 shown in FIG. 4). Although the illustrated embodiment includes two stabilizing cavities 180, 182 for receiving the leg 104 in two raised positions, there may be more than two stabilizing cavities in the stabilizing member 178 for receiving the leg 104 such that the user can choose among more than two raised positions, each position resulting in a differently sized space 14 (FIG. 1) in the trunk 10. Furthermore, the member 178 includes two wings 190 protruding outwardly to form mounting surfaces 192 for mounting the member 178 to the floor 170, for example. The other stabilizing members 76, 112 discussed hereinabove may also include such wings 190 in some embodiments. The floor 170 may be configured according to the number of cavities 180, 182 in the member 178. For example and without limitation, the cavity 108 formed in the trunk floor 170 (shown in FIGS. 4-5) may be enlarged to provide access to each stabilizing cavity 180, 182 in the member 178, or there may be multiple cavities 108 formed in the trunk floor, each cavity 108 corresponding to a different position of the panel 106.

Figure 8:
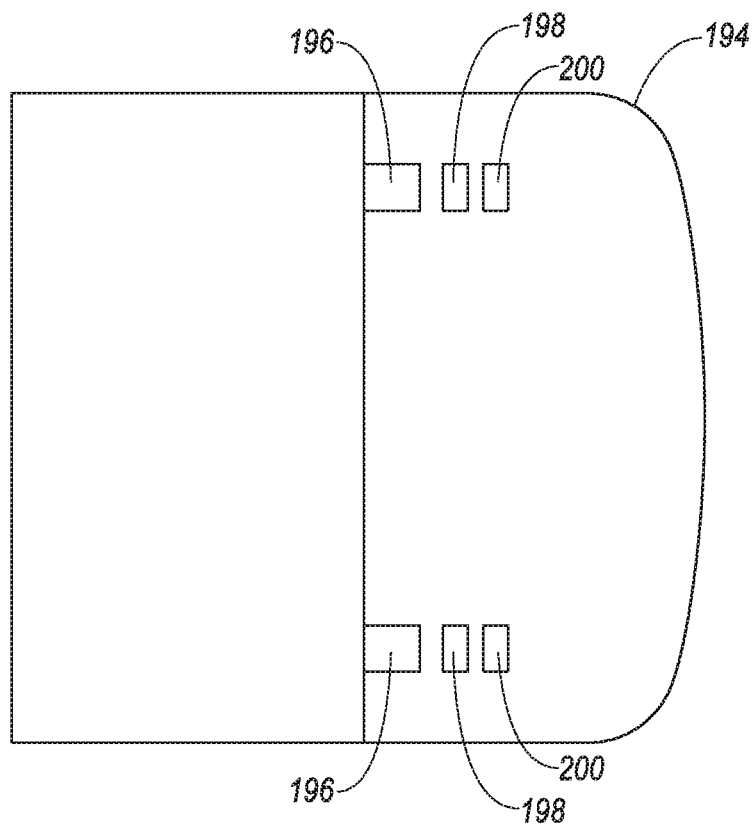
FIG. 8 is a top plan view of a trunk floor that may be used in the vehicle trunk of FIG. 1 in accordance with another embodiment of the instant disclosure.

FIG. 8 is a top plan view of a trunk floor 194 that may be used in the vehicle trunk 10 of FIG. 1 in accordance with another embodiment of the instant disclosure. The trunk floor 194 may be similar to the trunk floors 22, 110 depicted in FIGS. 1-5 except there may be multiple cavities 196, 198, 200 formed in the trunk floor 194 for receiving portions of the leg 104 in different positions, each cavity 196, 198, 200 being used for a different position. The cavity 196 may be used in the lowered position; the cavity 198 may be used in a raised position; and cavity 200 may be used in another raised position in which the panel is positioned closer to the opening 18 of the trunk 10.

With some or all of the above configurations, the space 14 of the trunk 10 (FIG. 1) may be varied depending on the needs of the user. If maximum space is desired, the panel 12, 106 may be positioned flush with the floor 22, 110, 194. If a smaller space 14 is desired such that items stored within the space 14 do not roll around the trunk 10 during operation of the vehicle, the user may remove the panel 12, 106 and position the panel 12, 106 in the raised position with ease. The above configurations may involve minimal parts and little to no modifications to the cavity(ies) 30 underneath the trunk floor 22, 110, 194.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure. Furthermore, details disclosed in connection with one embodiment apply to other disclosed embodiments as well, unless specified otherwise.

What is claimed is:
1. A vehicle trunk comprising:
a panel having a leg protruding past a perimeter thereof; and
a trunk floor defining a recess and cavity, the leg occupying a first portion of the cavity to secure the panel perpendicular to the floor, and a second portion of the cavity different from the first to secure the panel flush within the recess such that the panel is disposed over unoccupied portions of the cavity.

2. The vehicle trunk of claim 1, further comprising a stabilizing member disposed underneath the trunk floor opposite the recess, wherein the stabilizing member defines a first stabilizing cavity for receiving the leg of the panel when the panel is perpendicular to the floor.

3. The vehicle trunk of claim 2, wherein the stabilizing member further defines a second stabilizing cavity adjacent the first stabilizing cavity for receiving the leg when the panel is flush within the recess.

4. The vehicle trunk of claim 1, wherein the cavity is disposed adjacent a perimeter of the recess.

5. The vehicle trunk of claim 1, wherein the cavity extends through a thickness of the trunk floor underneath the recess.

6. The vehicle trunk of claim 1, wherein an elevated topside of the trunk floor disposed adjacent the recess is flush with a topside of the panel when the panel is flush within the recess.

7. The vehicle trunk of claim 1, wherein the leg protrudes from an underside of the panel that is visible when the panel is perpendicular to the trunk floor.

8. A vehicle trunk comprising:
a panel having a leg protruding from a major side thereof past a perimeter of the panel; and
a trunk floor defining a recess and cavity adjacent an edge of the recess, such that the leg is engageable with the cavity
in a first position to secure the panel perpendicular to the floor, and
in a second position to secure the panel flush within the recess.

9. The vehicle trunk of claim 8, wherein the leg is L-shaped with a base of the leg projecting from the major side of the panel, and a longitudinal portion of the leg extending perpendicularly from the base in a direction parallel to the major side.

10. The vehicle trunk of claim 9, wherein the longitudinal portion of the leg occupies a first portion of the cavity in the first position, and wherein the base of the leg occupies a second portion of the cavity different from the first in the second position.

11. The vehicle trunk of claim 8, further comprising a stabilizing member disposed underneath the trunk floor opposite the recess, wherein the stabilizing member defines a first stabilizing cavity for receiving the leg of the panel in the first position.

12. The vehicle trunk of claim 11, wherein the stabilizing member further defines a second stabilizing cavity adjacent the first stabilizing cavity for receiving the leg in the second position.

13. The vehicle trunk of claim 12, wherein the stabilizing member further defines a third stabilizing cavity for receiving the leg in a third position to secure the panel perpendicular to the floor, and wherein the third stabilizing cavity is adjacent the first stabilizing cavity such that the first stabilizing cavity is disposed between the second and third stabilizing cavities.

14. A vehicle trunk comprising:
a moveable panel having a first leg protruding therefrom; and
a trunk floor defining a recessed surface area and a first cavity adjacent thereto for engaging with the first leg, such that a minor side of the panel contacts and is supported by the recessed surface area in a first position, and a major side of the panel contacts and is supported by the recessed surface area in a second position.

15. The vehicle trunk of claim 14, wherein the first leg protrudes from the major side past the minor side.

16. The vehicle trunk of claim 14, wherein the first leg occupies a first portion of the first cavity in the first position, and the first leg occupies a second portion of the first cavity adjacent the first portion in the second position.

17. The vehicle trunk of claim 14, wherein the panel is perpendicular to the recessed surface area in the first position, and wherein the panel is flush with an elevated topside of the trunk floor that is parallel to and offset from the recessed surface area of the floor in the second position.

18. The vehicle trunk of claim 17, wherein the minor side of the panel abuts an edge surface of the floor that extends between the elevated topside and recessed surface area in the first position.

19. The vehicle trunk of claim 18, wherein the first leg protrudes past the edge surface of the floor and below the elevated topside in the second position.

20. The vehicle trunk of claim 14, wherein the panel has a second leg spaced apart from the first leg and protruding from the major side past the minor side, and wherein the trunk floor defines a second cavity adjacent to the recessed surface area for engaging with the second leg in the first and second positions.

* * * * *